US008885548B2

(12) United States Patent
Pandey et al.

(10) Patent No.: US 8,885,548 B2
(45) Date of Patent: *Nov. 11, 2014

(54) APPARATUS AND METHOD FOR ADMITTING NEW DEVICES IN A SELF-HEALING, SELF-ORGANIZING MESH NETWORK

(75) Inventors: Raju Pandey, Davis, CA (US); Rituparna Ghosh, Folsom, CA (US); Seokman Paul Han, Rancho Cordova, CA (US)

(73) Assignee: SynapSense Corporation, Folsom, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 12/005,720

(22) Filed: Dec. 28, 2007

(65) Prior Publication Data
US 2009/0168703 A1 Jul. 2, 2009

(51) Int. Cl.
*H04B 7/212* (2006.01)
*H04W 8/00* (2009.01)
*H04W 84/18* (2009.01)

(52) U.S. Cl.
CPC .............. *H04W 8/005* (2013.01); *H04W 84/18* (2013.01)
USPC ............................ 370/324; 370/445; 370/447

(58) Field of Classification Search
USPC .................................................. 370/445, 447
See application file for complete search history.

(56) References Cited

U.S. PATENT DOCUMENTS

| | | | |
|---|---|---|---|
| 5,379,290 A | * | 1/1995 | Kleijne .......................... 370/313 |
| 5,515,369 A | | 5/1996 | Flammer, III |
| 5,896,412 A | | 4/1999 | Levanon |
| 6,208,247 B1 | | 3/2001 | Agre |
| 6,404,756 B1 | | 6/2002 | Whitehill |
| 6,442,596 B1 | | 8/2002 | Dyer |
| 6,480,497 B1 | | 11/2002 | Flammer, III |
| 6,590,928 B1 | | 7/2003 | Haartsen |

(Continued)

FOREIGN PATENT DOCUMENTS

| | | |
|---|---|---|
| CA | 2616715 | 2/2007 |
| CN | 101401480 | 4/2009 |

(Continued)

OTHER PUBLICATIONS

Jungmin So et al., "Routing and Channel Assignment in Multi-Channel Multi-Hop Wireless Networks with Single Network Interface," Second International Conference on Quality of Service in Heterogeneous Wired/Wireless Networks (QShine), Aug. 2005.*

(Continued)

*Primary Examiner* — Brandon Renner
*Assistant Examiner* — Scott M Sciacca
(74) *Attorney, Agent, or Firm* — Inventive Patent Law P.C.; Jim H. Salter

(57) ABSTRACT

Various embodiments provide an apparatus and method for admitting new devices in a self-healing, self-organizing mesh network. An example embodiment is configured to listen on a dynamically-determined frequency for the network management message; to send jamming messages to neighbor nodes in the wireless mesh network, if the network management message is not received; to receive the network management message from a neighbor node in response to the jamming messages; to synchronize a node timer to the received network management message; and to begin data communications with neighbor sensors using the synchronized node timer.

13 Claims, 11 Drawing Sheets

(56) References Cited

U.S. PATENT DOCUMENTS

| | | | |
|---|---|---|---|
| 6,735,630 B1 | 5/2004 | Gelvin | |
| 6,807,165 B2 | 10/2004 | Belcea | |
| 6,850,502 B1 | 2/2005 | Kagan | |
| 6,856,591 B1 | 2/2005 | Ma et al. | |
| 6,859,831 B1 | 2/2005 | Gelvin | |
| 7,010,392 B2 | 3/2006 | Bash | |
| 7,020,701 B1 | 3/2006 | Gelvin | |
| 7,031,329 B2 | 4/2006 | Lipsanen | |
| 7,031,870 B2 | 4/2006 | Sharma | |
| 7,086,603 B2 | 8/2006 | Bash | |
| 7,176,808 B1 | 2/2007 | Broad | |
| 7,180,915 B2 | 2/2007 | Beyer | |
| 7,272,129 B2 | 9/2007 | Calcev | |
| 7,313,461 B2 | 12/2007 | Sharma | |
| 7,349,349 B2* | 3/2008 | Acharya et al. | 370/254 |
| 7,436,789 B2* | 10/2008 | Caliskan et al. | 370/310.1 |
| 7,463,644 B2 | 12/2008 | Zhu | |
| 7,502,360 B2 | 3/2009 | Liu | |
| 7,522,563 B2* | 4/2009 | Rhee | 370/338 |
| 7,680,092 B2 | 3/2010 | VanLaningham | |
| 7,706,340 B2* | 4/2010 | Bronez | 370/338 |
| 7,885,251 B2* | 2/2011 | Kim et al. | 370/350 |
| 8,023,495 B1* | 9/2011 | van Erven | 370/350 |
| 2002/0073152 A1 | 6/2002 | Andrew | |
| 2002/0136183 A1* | 9/2002 | Chen et al. | 370/338 |
| 2003/0067892 A1 | 4/2003 | Beyer | |
| 2005/0024826 A1 | 2/2005 | Bash | |
| 2005/0030968 A1 | 2/2005 | Rich et al. | |
| 2005/0074025 A1 | 4/2005 | Shao et al. | |
| 2005/0129051 A1 | 6/2005 | Zhu | |
| 2005/0173549 A1 | 8/2005 | Bash | |
| 2005/0190731 A1* | 9/2005 | Bejerano et al. | 370/338 |
| 2005/0201340 A1 | 9/2005 | Wang | |
| 2005/0213612 A1 | 9/2005 | Pister | |
| 2005/0239411 A1 | 10/2005 | Hazra | |
| 2006/0029060 A1 | 2/2006 | Pister | |
| 2006/0029061 A1* | 2/2006 | Pister et al. | 370/389 |
| 2006/0034191 A1 | 2/2006 | Sahinoglu | |
| 2006/0126501 A1 | 6/2006 | Ramaswamy | |
| 2006/0149408 A1 | 7/2006 | Speetzer | |
| 2006/0161909 A1 | 7/2006 | Pandey | |
| 2006/0198346 A1* | 9/2006 | Liu et al. | 370/338 |
| 2006/0209884 A1* | 9/2006 | MacMullan et al. | 370/465 |
| 2006/0215581 A1 | 9/2006 | Castagnoli | |
| 2006/0215583 A1 | 9/2006 | Castagnoli | |
| 2006/0225446 A1 | 10/2006 | Bash | |
| 2006/0268791 A1* | 11/2006 | Cheng et al. | 370/338 |
| 2006/0269028 A1 | 11/2006 | Bley | |
| 2007/0050523 A1* | 3/2007 | Emeott et al. | 709/248 |
| 2007/0116060 A1 | 5/2007 | Qu | |
| 2007/0208992 A1 | 9/2007 | Koren | |
| 2007/0211686 A1 | 9/2007 | Belcea | |
| 2007/0258508 A1 | 11/2007 | Werb | |
| 2008/0008138 A1* | 1/2008 | Pun | 370/338 |
| 2008/0019265 A1 | 1/2008 | Alluisi et al. | |
| 2008/0019302 A1 | 1/2008 | Nagarajan et al. | |
| 2008/0040509 A1* | 2/2008 | Werb et al. | 709/242 |
| 2008/0043707 A1 | 2/2008 | Ren | |
| 2008/0089311 A1* | 4/2008 | Roy et al. | 370/345 |
| 2008/0095222 A1 | 4/2008 | VanLaningham | |
| 2008/0151801 A1 | 6/2008 | Mizuta | |
| 2008/0170544 A1* | 7/2008 | Tang et al. | 370/329 |
| 2008/0269932 A1 | 10/2008 | Chardon | |
| 2008/0298450 A1 | 12/2008 | Zhang | |
| 2009/0022136 A1* | 1/2009 | Joshi et al. | 370/348 |
| 2009/0067448 A1* | 3/2009 | Stanwood et al. | 370/447 |
| 2009/0073925 A1* | 3/2009 | Rentel et al. | 370/329 |
| 2009/0080455 A1* | 3/2009 | Ewing et al. | 370/445 |
| 2009/0109992 A1 | 4/2009 | Lurie | |

FOREIGN PATENT DOCUMENTS

| | | |
|---|---|---|
| DE | 202006019810 | 5/2007 |
| EP | 1719301 | 11/2006 |
| EP | 1911184 | 4/2009 |
| JP | 2004-336779 | 11/2004 |
| JP | 2006-311549 | 11/2006 |
| JP | 2009504010 | 1/2009 |
| KR | 10-0646748 | 11/2006 |
| KR | 10-2007-0009390 | 1/2007 |
| KR | 10-2007-0105731 | 10/2007 |
| WO | WO2005083953 | 9/2005 |
| WO | WO2007015962 | 6/2007 |
| WO | WO2008021278 | 7/2008 |

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

* cited by examiner

APPARATUS AND METHOD FOR ADMITTING NEW DEVICES IN A SELF-HEALING, SELF-ORGANIZING MESH NETWORK

RELATED APPLICATIONS

This patent application is related to co-pending patent application Ser. No. 12/001,884, filed on Dec. 12, 2007, titled, "APPARATUS AND METHOD FOR ADAPTIVE DATA PACKET SCHEDULING IN MESH NETWORKS, and assigned to the same assignee as the present application.

This patent application is related to co-pending patent application Ser. No. 12/001,917, filed on Dec. 12, 2007, titled, "APPARATUS AND METHOD FOR ADAPTING TO FAILURES IN GATEWAY DEVICES IN MESH NETWORKS, and assigned to the same assignee as the present application.

TECHNICAL FIELD

The disclosed subject matter relates to the field of network communications, and more particularly to data communications in mesh networks.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g. radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (the nodes are "plugged in") or from batteries in each node. As the size, power, and cost of the computation and communication requirements of these devices has decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensor. Further, it is important to monitor the operational status of each of the sensors.

Given that most WSN devices are battery powered, the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on only when devices need to send and/or receive data. The operational lifetime of the network, thus, depends on the ability to identify and schedule wakeup and sleep times for the radios in the wireless network nodes.

U.S. Pat. No. 6,850,502 describes a join process for a wireless mesh topology network. In the network, nodes have multiple spatial coverage sub-sectors together covering a larger sector angle and a node can establish connection with other nodes located in directions covered by its sub-sectors. The join process adds a joining node to the network and includes having the joining node listen to sub-sectors at a specific receiving frequency for a defined time. Thereafter, the network node changes its sub sectors and its receiving frequencies according to a defined timing and sequence. Active network nodes transmit organized invitation data packets on defined sectors, frequencies and timing, based on relative location and relative angle orientation deduced from sub-sectors already in use for existing internal network communication. This reduces frequency interference in the network and reduces time required for the join process.

Thus, an apparatus and method for admitting new devices in a self-healing, self-organizing mesh network are needed.

DETAILED DESCRIPTION

Figure 1:
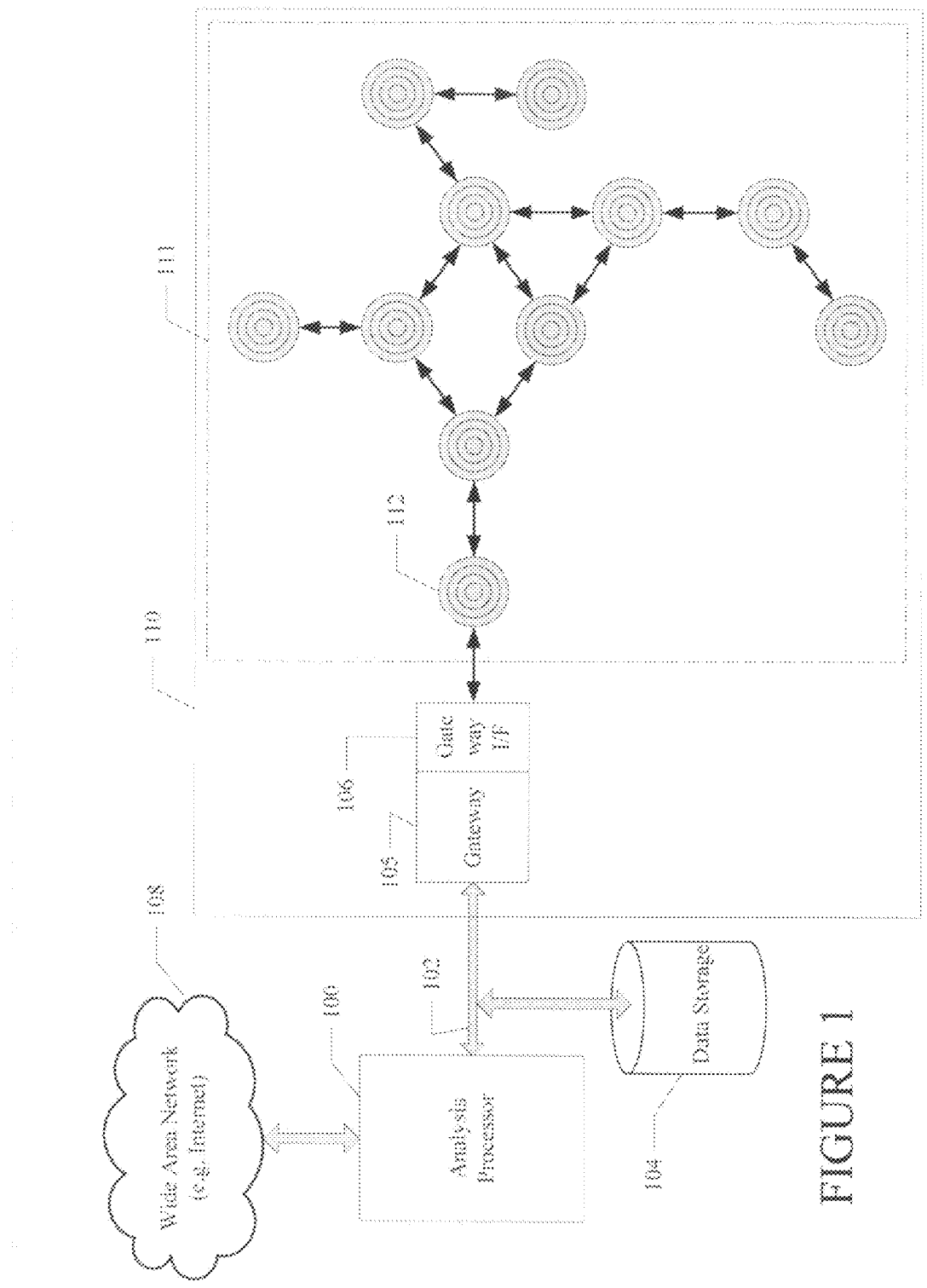
FIG. 1 illustrates a mesh network environment in which various embodiments can operate.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for admitting new devices in a self-healing, self-organizing mesh network. A particular embodiment relates to wireless data networks and more particularly to a multiple-hop wireless radio frequency mesh network adaptive data communications process employing a packet-switched time-sharing communications protocol. The particular embodiment has application to data collection from an array of sensors disposed in a network topology wherein at least two intelligent communication nodes are within reliable radio communication range within an array of peer communication nodes. The particular embodiment of an example system and method described herein presents an adaptive approach for node joining operations in a wireless sensor network so that power consumption, latency, and throughput can be optimized. The particular embodiment of an example system and method described herein uses a localized wakeup mechanism that reduces the time it takes for a device to become part of the network.

Given that most WSN devices are battery powered, the overall network lifetime depends on the efficiency with which sensing, computing, and data transmission by the sensors can be achieved. As described above, it is critical that operation of the radios on these devices be managed carefully. This is primarily achieved by turning the radio in a network node on only when devices need to send and/or receive data. This mode of operation is called the low power listening (LPL) mode. In order to settle into the LPL mode, devices in the network synchronize to a common clock, and use this clock to determine when they should turn the radio on and when they should turn it off. A master device, called a gateway or network controller, periodically sends a time synchronization signal (separately or as part of a network management message) to all devices in the network to keep the network nodes synchronized to a common clock. In order to reduce traffic in the network, the gateway keeps the intervals between two synchronization signals as large as possible. In an alternative embodiment, any of the nodes of the network or an agent may provide the synchronization signal for the other network nodes. Alternatively, an external signal source may be used as a basis for the time synchronization of network nodes.

When a node attempts to join a wireless mesh network, the joining node must first learn the schedule of the network so that the joining node can turn its radio on at the same time as the other nodes in the network. This is typically achieved by keeping the radio in the joining node on all the time and listening to network management messages (e.g. packets) on the network. The joining node uses the network management packets to learn how the joining node can synchronize its own operation with the operations of the other nodes. The synchronization may involve learning the time schedule, channel of operation, or other network state information. Typically, the joining node needs about n (n>=3) synchronization signals to coordinate its local timers with the common local time on the network. The accuracy with which synchronization can be achieved is decreased if a smaller number of synchronization signals are used. For example, if a time synchronization signal is sent after every hour, a joining node may have to wait for 3-4 hours before the joining node can become part of the network. Several problems are observed during the admission process in conventional systems: first, the time to enter the network may be too large. Networks that include larger number of devices will require significant amount of time to become fully operational. Secondly, the joining node may lose a significant amount of battery power while the joining node waits to synchronize its operation. Finally, devices that fall out of the network because they lose synchronization for some reason may not be able to send sensor data over a long period of time.

In the various embodiments described herein, a system and process is disclosed to provide several advantages over the existing mesh network implementations. First, the various embodiments described herein reduce the amount of time required for a device to join (or rejoin) a mesh network, particularly when network nodes are operating in the low power listening mode. Secondly, the various embodiments described herein reduce the amount of energy that a device spends waiting to join the network. The network and node configuration in a particular example embodiment are described in more detail below.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the WSN 110 can obtain access to the Internet.

Gateway 105 can also provide synchronization timing for the nodes 112 of WSN 110. Gateway 103 can send periodic messages to each of the nodes 112 of WSN 110. These periodic messages can include a timing signal (e.g. a beacon) to which each of the nodes 112 can synchronize their internal timers. Similarly, messages from gateway 105 to each of the nodes 112 can be used to provide system status, configuration, and control settings for the nodes of WSN 110. The transfer of messages between the gateway 105 and each of the nodes 112 or between a node 112 and all other nodes of WSN 110 in a broadcast or multicast transmission is termed a global communication. According to a particular embodiment, communication between nodes 112 and/or between nodes 112 and gateway 103 occurs only at specific times and on specific channels for local and global data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. The join process is described in more detail below. A node can be in data communication with neighbors that are within the radio reception range of the node. Depending on the strength of the wireless transceivers (e.g. radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
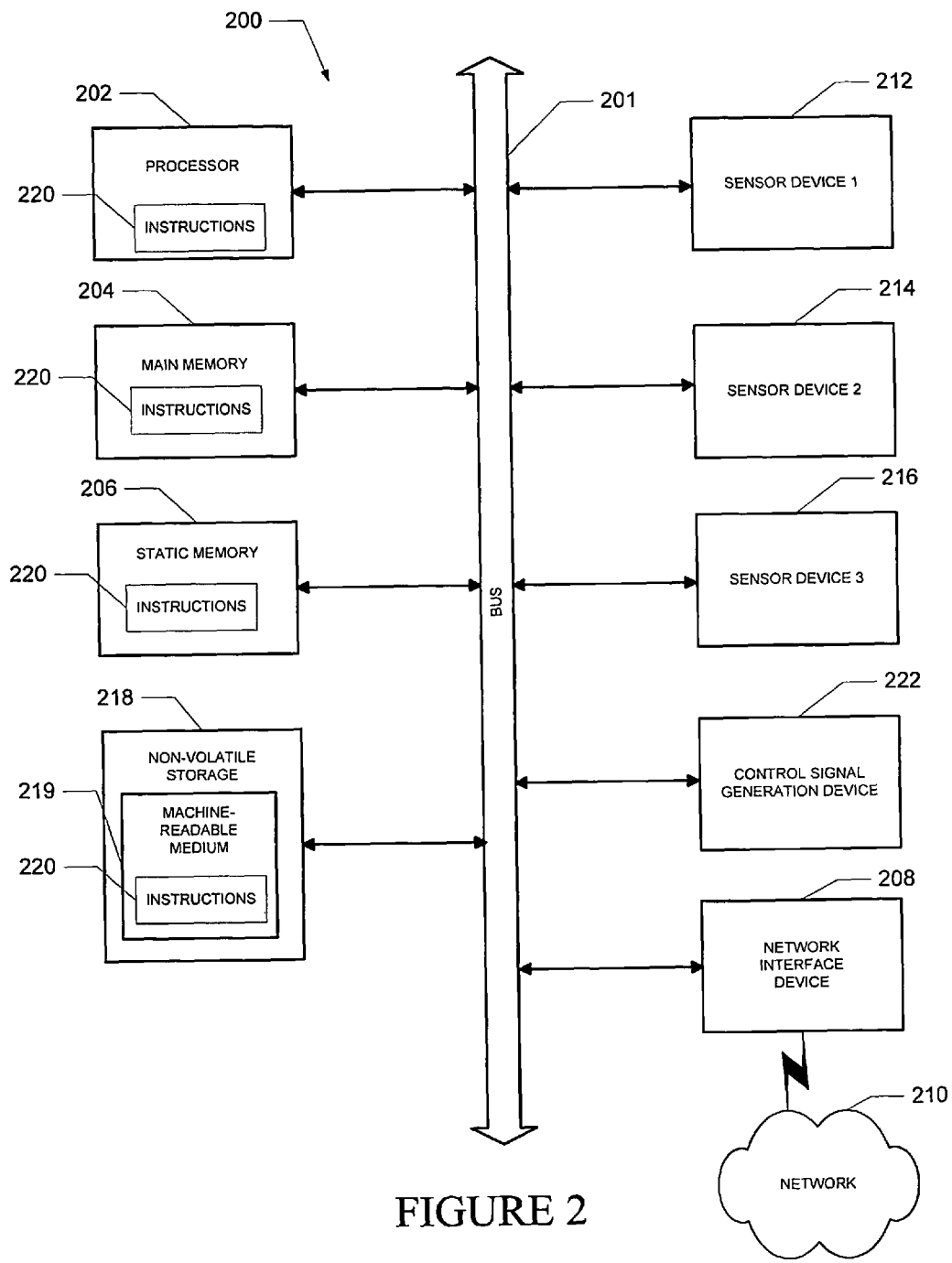
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the terms "machine", "device", or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, tooling or machine system activation and status, and the like. In general, sensor devices 212, 214, and 216 can include any sensors for detecting and measuring a desired condition within an environmental management system, process control system, building management system, or the like.

The node 200 may further include a non-volatile memory 218, a control signal generation device 222, and a network interface device 208 (e.g. a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g. radios) in the network nodes consume the most electrical power and represent the largest drain on the node's battery power. As such, the radio should be turned off for most of the time to increase the battery lifetime of the nodes. In an example embodiment, all nodes of WSN 110 are time synchronized. Each node wakes up for a short period of time for radio communication with other nodes or the gateway. Then, the node's radio is shut off and the node sleeps until the next scheduled communication cycle.

In conventional wireless network systems, a cycle time is divided into a fixed plurality of communication time slots, during each of which one of the nodes transmits. During normal operations of the WSN 110, each slot becomes active sequentially in a round-robin fashion during the cycle time. Only one node can send data in a given slot. If multiple nodes have a packet to send, the nodes compete for the slot using a Carrier Sense Multiple Access (CSMA) protocol. This well-known scheme is fairly inefficient and does not scale to large number of nodes. As the number of packets being communicated in the network increases, the network becomes unreliable; because, there is a high probability that the packets collide (i.e. packets get transmitted on the same channel at the same time by more than one node causing the data communication to become garbled and unusable). As packets collide, there are more retransmissions, causing even more collisions.

One simple solution is to increase the number of slots in the cycle. However, this solution causes the nodes to wake up more often causing the nodes to consume more power.

In a particular embodiment, global time is represented as a time period divided into a plurality of frames. Each frame is further subdivided into a plurality of slots. Each of the plurality of slots provides a time segment for local data communication between nodes in a mesh network. The network nodes use the slots to synchronize and send messages to other nodes. The details of the time slot configuration and allocation is described in more detail in the above-referenced co-pending patent application.

As described herein, a particular embodiment of an example system and method uses a localized wakeup mechanism that reduces the time it takes for a device to become part of the network. In many circumstances, the nodes of a WSN 110 may enter a low power listening (LPL) mode when network conditions and the environment in which the WSN 110 is operating warrants a transition into the LPL mode. Such a transition to LPL mode may occur when a network or monitored environment is idle. The LPL mode enables the nodes of the WSN 110 to save power and thereby extend their service life. While in the LPL mode, the network devices are operating at a minimal level. As such, the network devices can significantly reduce the number of data communications the devices conduct with neighbor nodes or the gateway device 105. Nevertheless, the gateway or other network controller device 105 continues to send network management messages or beacons periodically to the nodes in WSN 110. The beacons enable the network nodes to remain synchronized for network communication. In some embodiments, the time period between network management messages can be extended to further save network node battery power.

In the various examples presented below, we assume that a wireless mesh network is operating in a steady state and the network devices are in the low power listening (LPL) mode. We also assume that the gateway or other network controller device is sending time synchronization beacons periodically. Given this situation, we further assume that a new (i.e. not previously connected to the network) device wants to join or rejoin the network. An example of this situation is illustrated in FIG. 3.

Figure 3:
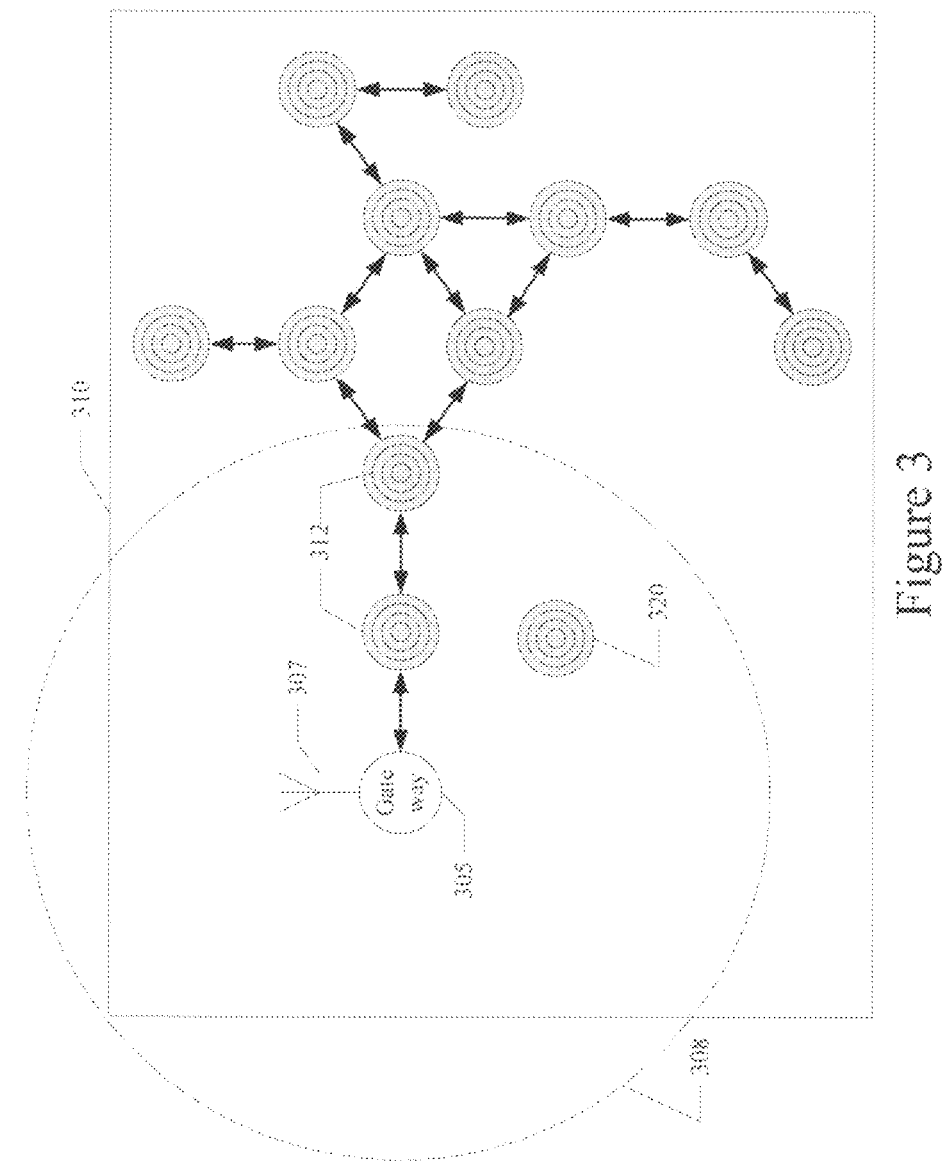
FIGS. 3-5 illustrate an example of a node joining a wireless mesh network when the joining node is within radio range of the gateway in a particular embodiment.

Referring now to FIG. 3, a WSN 310 is illustrated. The WSN 310 includes a gateway 305 that is periodically sending network management messages or beacons to the nodes in WSN 310 as indicated by the symbol 307 shown in FIG. 3. The network management message can include a synchronization signal and/or information indicative of same for the other network nodes. Note that in an alternative embodiment, any of the nodes of the network 310 or an agent may provide the network management message including a synchronization signal for the other network nodes. Alternatively, an external signal source may be used as a basis for the time synchronization of network nodes. The circle 308 around gateway 305 illustrates the range within which a node could receive the wireless transmission of the periodic beacon from gateway 305. The connected nodes of WSN 310, such as nodes 312, can receive the beacon from gateway 305 either directly or via other nodes of the WSN 310 that are in data communications with each other as described above.

In the example shown in FIG. 3, we assume that a new node (node 320) has been placed at the indicated position within the wireless transmission range of the gateway 305 and activated for receipt of wireless data communications messages from gateway 305 or other nodes of WSN 310.

Start Up Phase

Figure 4:
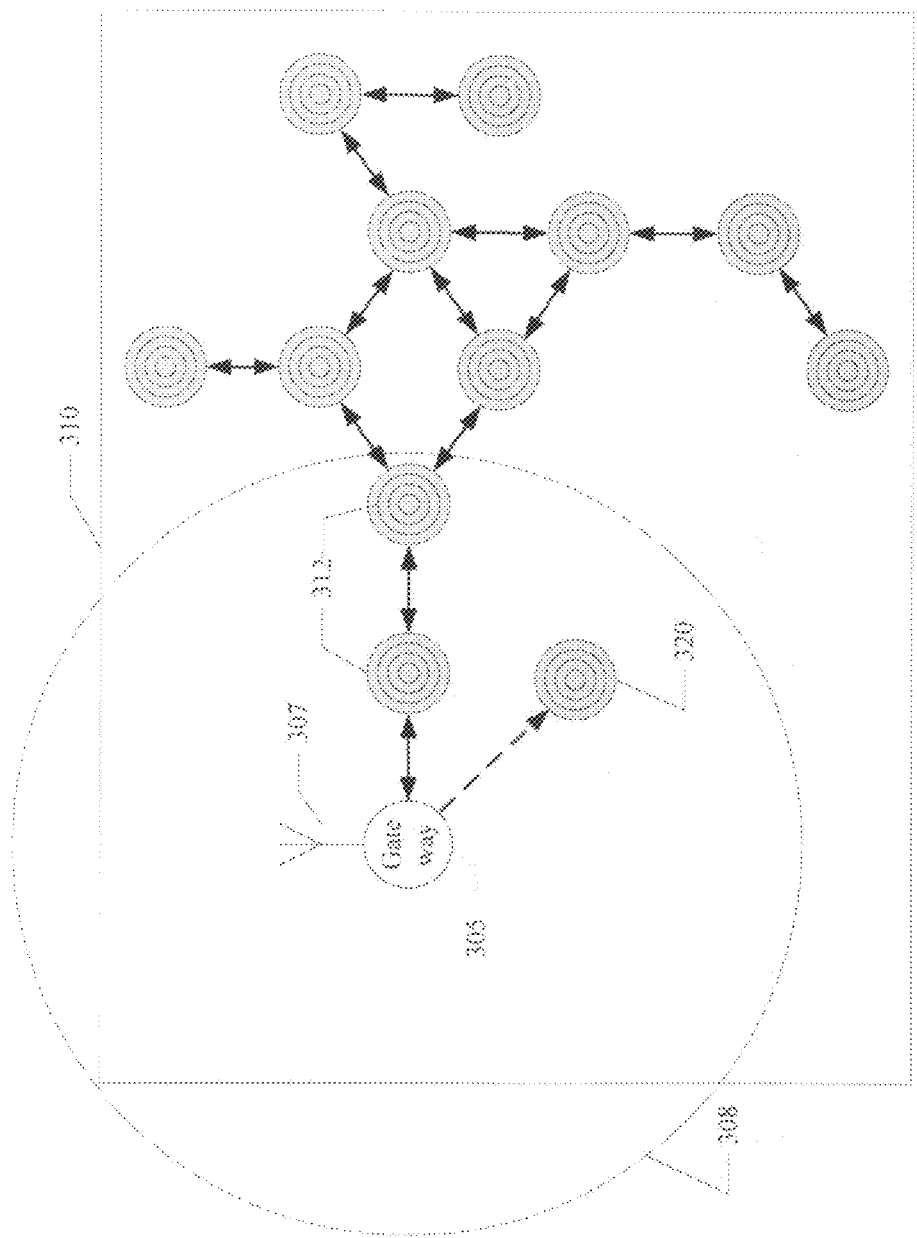

Referring still to FIG. 3, new node (node 320) starts by first listening to the ongoing data traffic of WSN 310 for a pre-determined amount of time. If node 320 is with radio range of at least one other node of WSN 310, node 310 will be able to receive data communications from a transmitting node of WSN 310. The nodes of WSN 310 may be communicating on a plurality of radio frequencies. As such, node 320 may need to configure its radio receiver to receive on each of a plurality of frequencies for a pre-determined amount of time, if no data is received on a particular frequency. Given that the nodes of WSN 310 may be in the LPL mode, it is possible that the nodes may not be regularly communicating and thus joining node 320 may not receive any data communications from these nodes. However, the gateway 305 (or other network controller) will be regularly transmitting the beacon (i.e. the network management messages) at regular intervals. The beacon can be distinguished from other data communications using a unique message identifier, header, or code associated with the beacon. Because in the example of FIG. 3 joining node 320 is located within the radio range of gateway 305, node 320 will eventually receive the beacon from gateway 305 even if node 320 does not receive data communications from other nodes of WSN 310 within the pre-determined time limit. The receipt of the beacon from gateway 305 by node 320 is shown in FIG. 4. Alternatively, node 320 may receive the beacon relayed from one or more of the nodes of WSN 310 that are proximate to (i.e. in the neighborhood of) node 320. This can happen in a dense network where several network devices receive and forward the beacon to other nodes.

Figure 5:
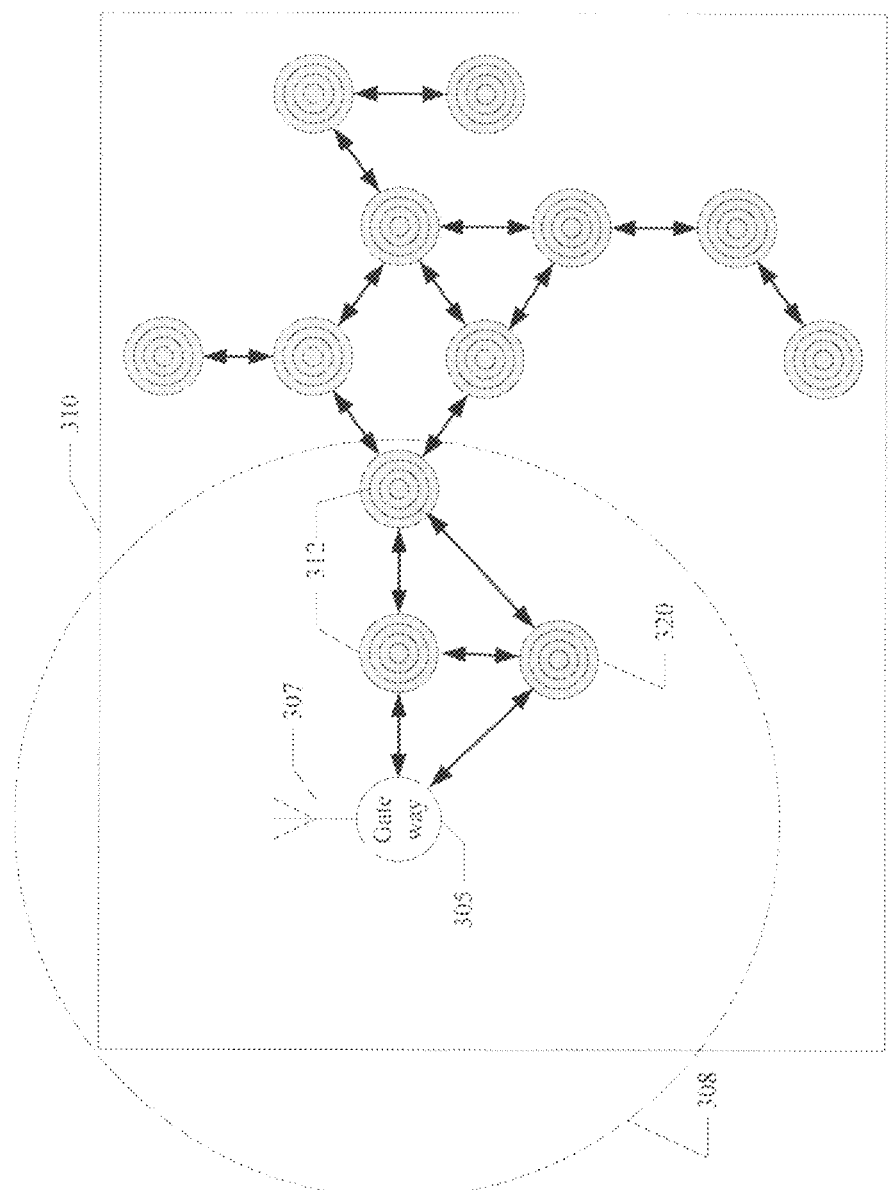

Once node 320 hears (i.e. receives) several time synchronization beacons from the gateway 305 or other network devices in the neighborhood of node 320 within the pre-determined amount of time, node 320 uses the beacons to synchronize its node clock (i.e. a synchronized node timer). When the node 320 has synchronized its node timer, the node 320 can begin to communicate with gateway 305 and other nodes of WSN 310. Once in network communication, node 320 can transmit and receive status and configuration information with gateway 305 and other nodes of WSN 310 to complete the process of joining network 310. At that time, node 320 has joined the network 310 as shown in FIG. 5.

Figure 6:
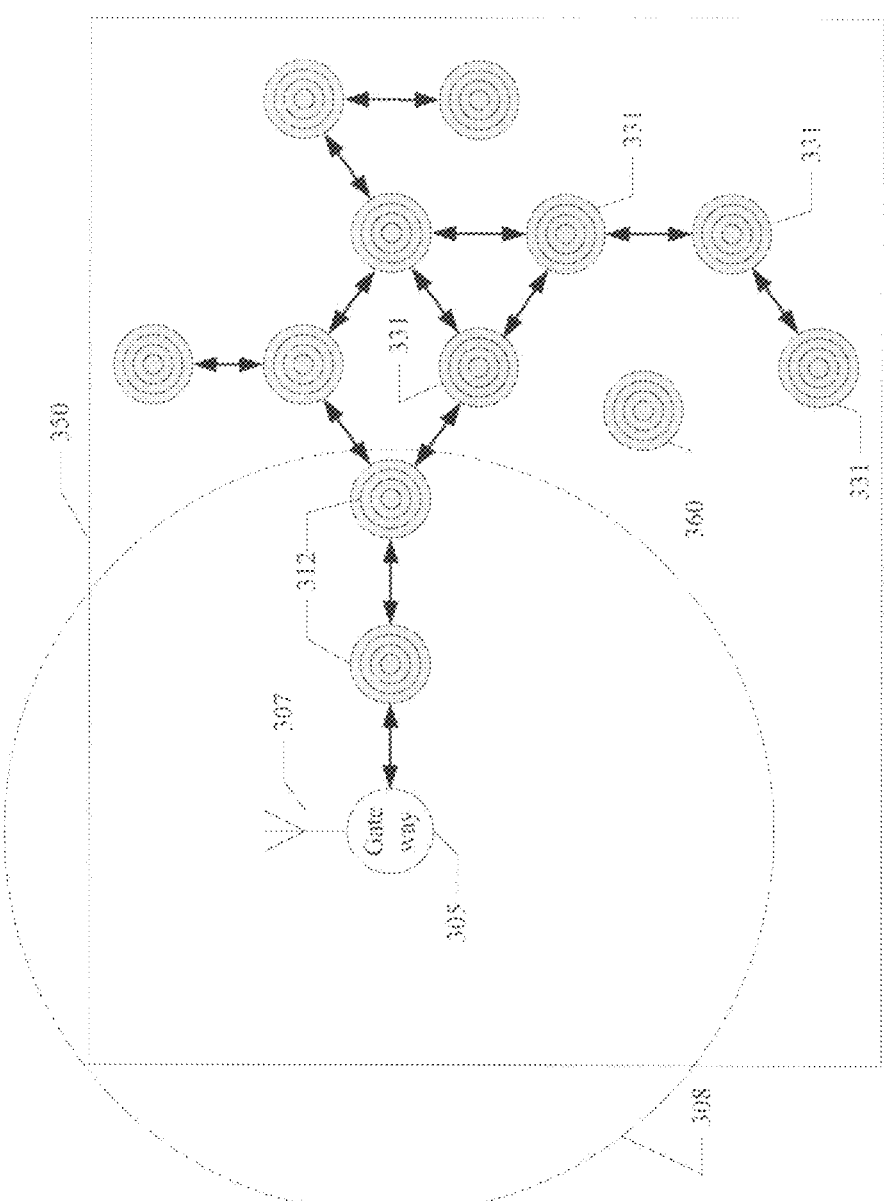
FIGS. 6-9 illustrate an example of a node joining a wireless mesh network when the joining node is not within radio range of the gateway and the joining node sends jamming message to proximate (neighbor) nodes in a particular embodiment.

Referring now to FIG. 6, a WSN 350 is illustrated. The WSN 350 includes a gateway 305 that is periodically sending network management messages or beacons to the nodes in WSN 350 as indicated by the symbol 307 shown in FIG. 6. The circle 308 around gateway 305 illustrates the range within which a node could receive the wireless transmission of the periodic beacon from gateway 305. The connected nodes of WSN 350, such as nodes 312 or 331, can receive the beacon from gateway 305 either directly or via other nodes of the WSN 350 that are in data communications with each other as described above.

In the example shown in FIG. 6, we assume that a new node (node 360) has been placed at the indicated position outside of the wireless transmission range of the gateway 305 and activated for receipt of wireless data communications messages from gateway 305 or other neighbor nodes of WSN 350, such as nodes 331.

Referring still to FIG. 6, new node (node 360) starts by first listening to the ongoing data traffic of WSN 350 for a pre-determined amount of time. If node 360 is within radio range of at least one other node of WSN 350, node 360 will be able to receive data communications from a transmitting node of WSN 350. As explained above, nodes of WSN 350 may be communicating on a plurality of radio frequencies. As such, node 360 may need to configure its radio receiver to receive on each of a plurality of frequencies for a pre-determined amount of time, if no data is received on a particular frequency. Given that the nodes of WSN 350 may be in the LPL mode, it is possible that the nodes may not be regularly communicating and thus joining node 360 may not receive any data communications from these nodes. Similarly, even though the gateway 305 (or other network controller) will be regularly transmitting the beacon (i.e. the network management messages) at regular intervals, in the example of FIG. 6 joining node 360 is not located within the radio range of gateway 305. As such, node 360 will not receive the beacon from gateway 305 and may not receive the beacon from any other nodes of WSN 350 within the pre-determined time limit. In this situation, node 360 will not be able to join the WSN 350 without further action. In view of this situation, for example, joining node 360 may need to alert at least one node of WSN 350 to send the beacon or other data communications to enable node 360 to join the WSN 350. In a particular embodiment, node 360 alerts network 350 of a desire to join the WSN 350 by sending jamming messages to one or more network nodes. This process is described in more detail below in connection with an example embodiment illustrated in FIGS. 7-9.

Channel Jamming

Figure 7:
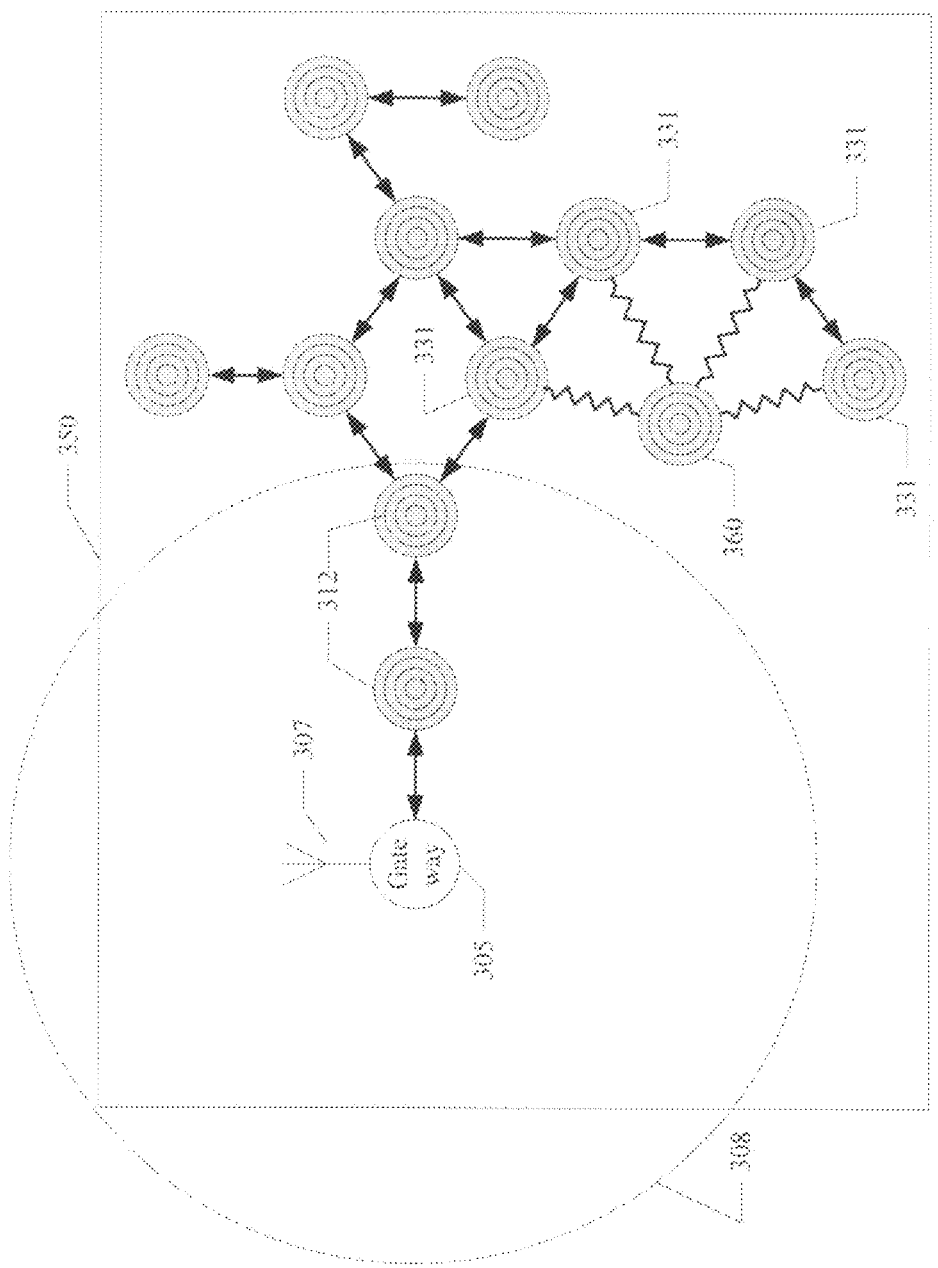

Referring to FIG. 7, joining node 360 is trying to join WSN 350. However, node 360 has been unable to receive the time synchronization beacon from gateway 305 or other nodes of WSN 350 as described above. According to a particular embodiment, if a joining network device does not hear any time synchronization beacon within a pre-determined time limit, the joining network device starts to jam one or more radio channels by sending data packets continuously on the one or more radio channels for a pre-determined amount of time t. FIG. 7 illustrates the jamming activity being performed by joining node 360 on network nodes 331. The goal of jamming is to let other connected network devices in the local network neighborhood know of the presence of the joining node. The data packets used to jam the one or more radio channels are identifiable as jamming data packets via a unique message identifier, header, or code in the message. Additionally, the jamming packet may contain enough semantic information (such as MAC headers) that the network devices can identify the jamming request from joining node 360. These jamming data packets may be of different sizes, may be sent at various intervals, and for various lengths of time. The packets may also be varied based on the channel upon which the jamming packets are sent. Time t is calculated to ensure that at least one device in the neighborhood is bound to identify the jamming packet(s). Time t is also used to ensure that the burst of jamming packets reaches the largest number of nodes.

Given that the network devices of WSN 350 may operate on different radio channels (e.g. frequencies) at different times, the joining network device 360 finds a common channel that the existing network devices are bound to use. Alternatively, the joining network device 360 can send a burst of jamming messages on each of a plurality of common network channels. Once the joining node 360 identifies one or more network channels, the joining node 360 then uses this channel or these channels to jam the network by sending one or more bursts of jamming messages on the channel(s) as shown in FIG. 7.

Jamming Response

Figure 8:
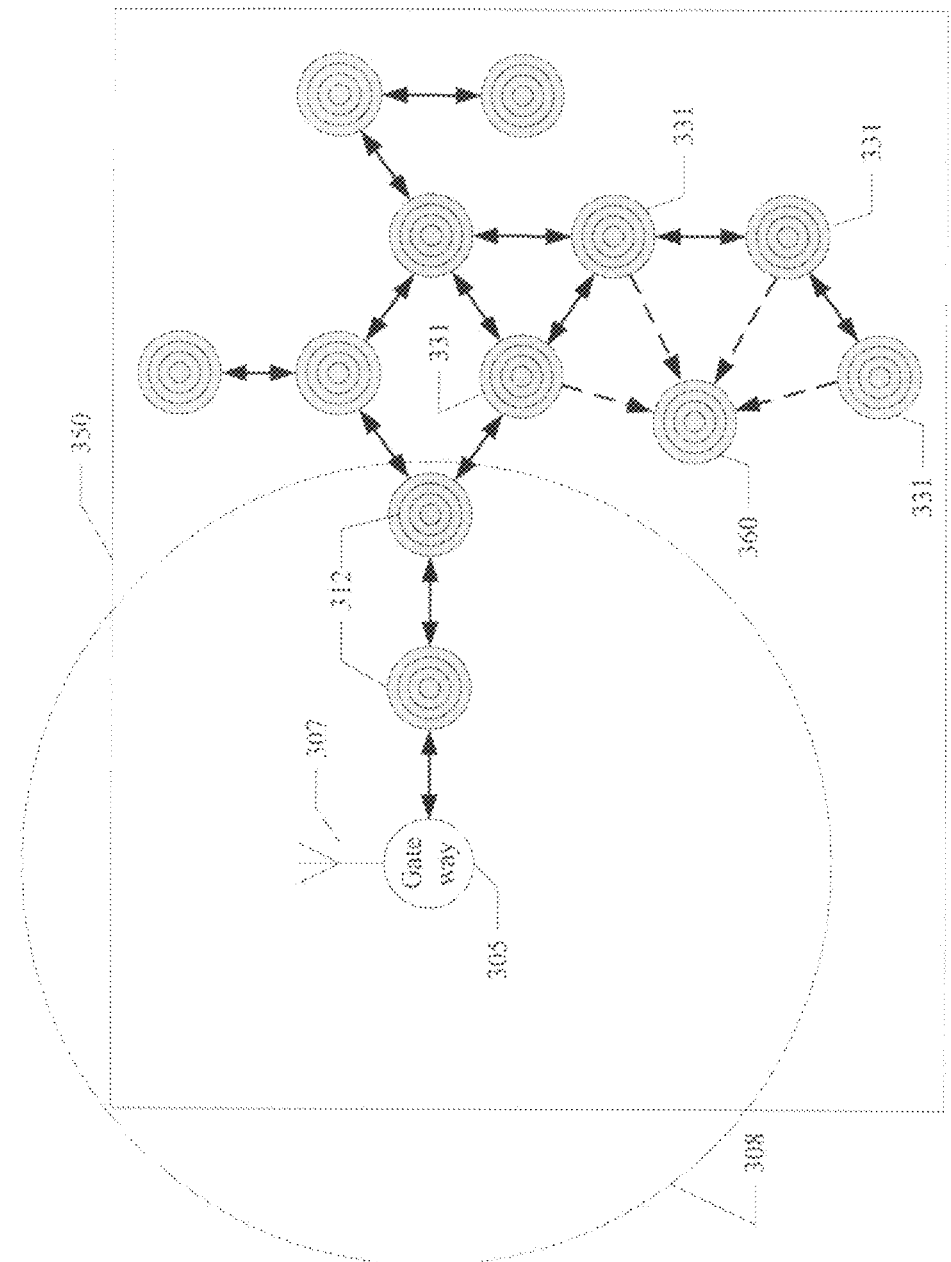

All connected network devices of WSN 350 that hear (i.e. receive) the jamming packets sent by joining node 360 respond by sending time synchronization (beacon) signals. The transmission of the beacon from connected network devices that hear the jamming packets to joining node 360 is shown in FIG. 8 by the dashed arrows. In a particular embodiment, a cooperative scheme is used in which the connected network devices in the network neighborhood cooperate to provide the time synchronization signals to the joining node 360. In a particular embodiment, each connected network device can respond to the jamming signal at most n (n>=3) times. The connected network devices can also monitor the radio channel used to provide the time synchronization signals to the joining node 360 to detect if other network devices in the neighborhood have responded to the joining node 360. If other network devices send time synchronization signals to the joining node 360, the network devices can reduce the number of responses that they need to send to the joining node 360. This allows the connected network devices to respond to the jamming signal quickly and without spending too much energy.

Figure 9:
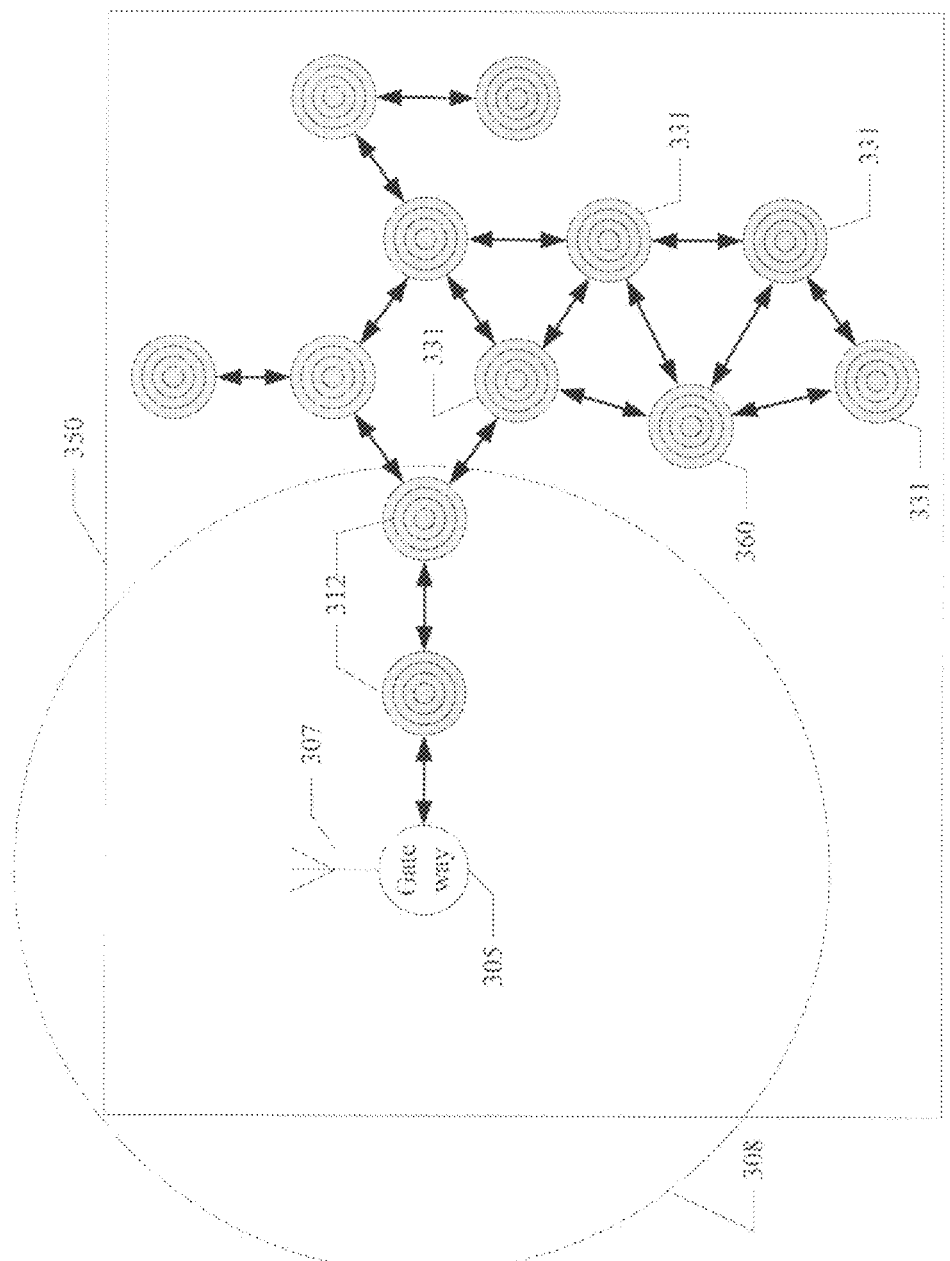

Once node 360 hears (i.e. receives) several time synchronization beacons from the network devices in the neighborhood of node 360 sent in response to the jamming messages within the pre-determined amount of time, node 360 uses the beacons to synchronize its node clock (i.e. a synchronized node timer). When the node 360 has synchronized its node timer, the node 360 can begin to communicate with gateway 305 and other nodes of WSN 350. Once in network communication, node 360 can transmit and receive status and configuration information with gateway 305 and other nodes of WSN 350 to complete the process of joining network 350. At that time, node 360 has joined the network 350 as shown in FIG. 9.

Figure 10:
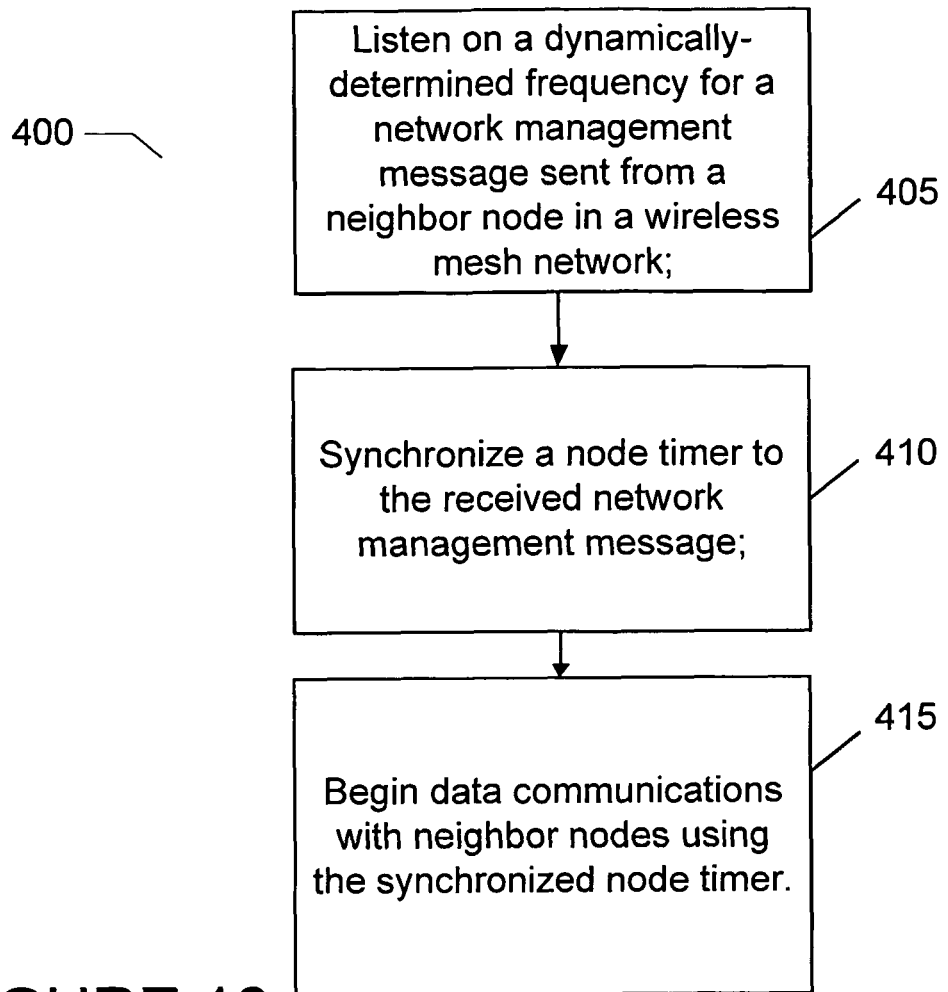
FIGS. 10-11 are flow diagrams illustrating the processing flow for a particular example embodiment.

FIG. 10 is a flow diagram illustrating the basic processing flow 400 for a particular embodiment. As shown, an example embodiment is configured to listen on a dynamically-determined frequency for a network management message sent from a neighbor node in a wireless mesh network (processing block 405); synchronize a node timer to the received network management message (processing block 410); and begin data communications with neighbor nodes using the synchronized node timer (processing block 415).

Figure 11:
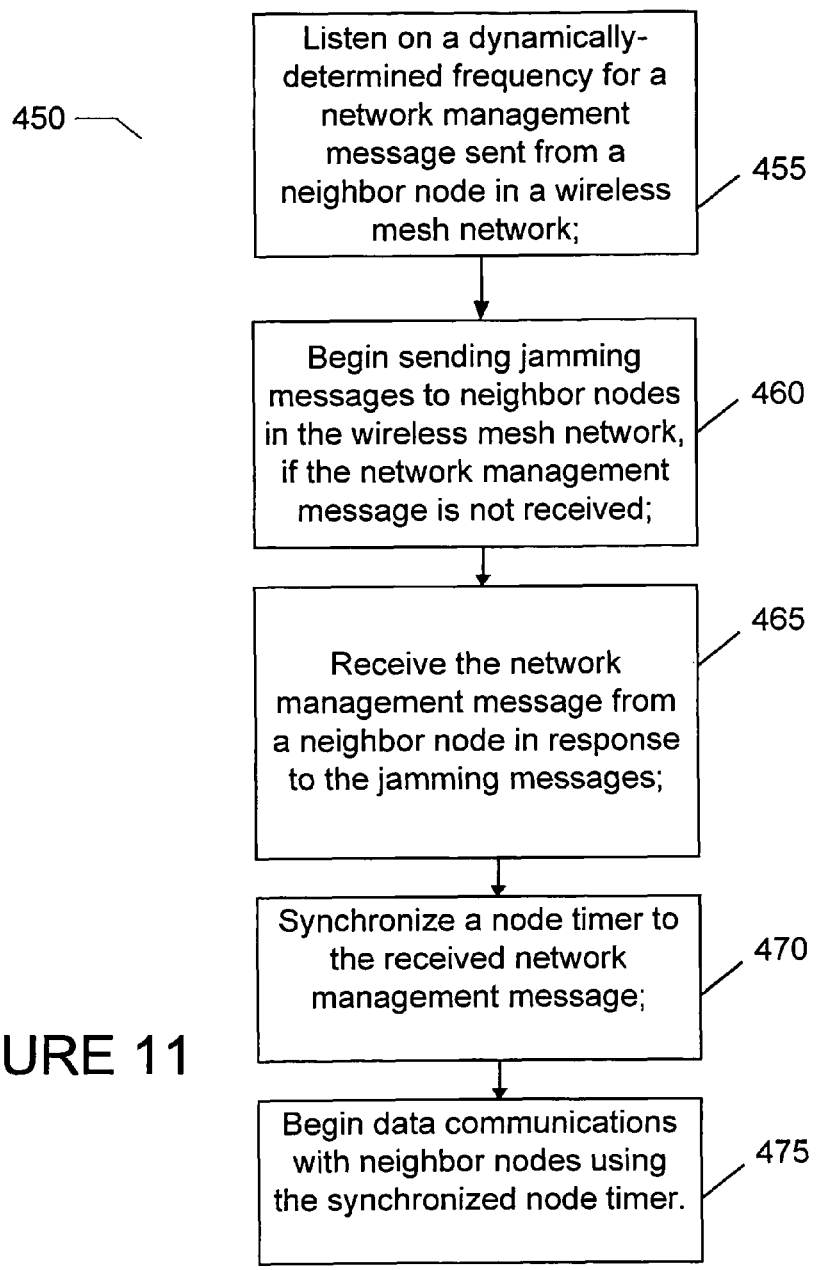

FIG. 11 is a flow diagram illustrating the basic processing flow 450 for another particular embodiment. As shown, an example embodiment is configured to listen on a dynamically-determined frequency for a network management message sent from a neighbor node in a wireless mesh network (processing block 455); begin sending jamming messages to neighbor nodes in the wireless mesh network, if the network management message is not received (processing block 460); receive the network management message from a neighbor node in response to the jamming messages (processing block 465); synchronize a node timer to the received network management message (processing block 470); and begin data communications with neighbor nodes using the synchronized node timer (processing block 475).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for admitting new devices in a self-healing, self-organizing mesh network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
listening on a dynamically-determined frequency for a network management message sent from a sending node in a wireless mesh network, the wireless mesh network including a neighbor node connected to the wireless mesh network and operating in a low power listening (LPL) mode, the neighbor node in the LPL mode deactivating its radio for at least a period of time;
synchronizing, by use of a processor, a node timer to the network management message, if the network management message is received, the network management message being received periodically throughout normal operation of the wireless mesh network to keep nodes of the wireless mesh network synchronized to a common clock;
sending, by use of the processor, jamming messages to the neighbor node from a joining node not currently connected to the wireless mesh network, the joining node not being connected to the wireless mesh network if the network management message is not received by the joining node, the jamming messages sent from the joining node being data packets each having a header with a unique message identifier, the jamming messages being sent continuously by the joining node for a pre-determined length of time on each of a plurality of different network channels until a response is received from the neighbor node, the jamming messages being varied based on the network channel upon which a particular jamming message is sent, wherein the jamming messages being varied includes at least one of varying the size of the jamming messages, transmitting the jamming messages at different intervals or varying the pre-determined length of time during which the jamming messages are transmitted, the neighbor node transitioning out of the LPL mode to respond to the jamming messages from the joining node, the neighbor node sending the network management message in response to the jamming messages;

receiving the network management message at the joining node from the neighbor node in response to the jamming messages from the joining node; and beginning data communications with nodes of the wireless mesh network using the synchronized node timer.

2. The method as claimed in claim 1 wherein the sending node is a gateway device.

3. The method as claimed in claim 1 including listening on the dynamically-determined frequency for a pre-determined amount of time.

4. The method as claimed in claim 1 wherein the jamming messages are identifiable as jamming messages based on the unique message identifier of the data packet header.

5. A network node comprising:
a processor; and
a network communication controller, in data communication with the processor, to listen on a dynamically-determined frequency for a network management message sent from a sending node in a wireless mesh network, the wireless mesh network including a neighbor node connected to the wireless mesh network and operating in a low power listening (LPL) mode, the neighbor node in the LPL mode deactivating its radio for at least a period of time; to synchronize a node timer to the network management message, if the network management message is received, the network management message being received periodically throughout normal operation of the wireless mesh network to keep nodes of the wireless mesh network synchronized to a common clock; to send jamming messages to the neighbor node from a joining node not currently connected to the wireless mesh network, the joining node not being connected to the wireless mesh network if the network management message is not received by the joining node, the jamming messages sent from the joining node being data packets each having a header with a unique message identifier, the jamming messages being sent continuously by the joining node for a pre-determined length of time on each of a plurality of different network channels until a response is received from the neighbor node, the jamming messages being varied based on the network channel upon which a particular jamming message is sent, wherein the jamming messages being varied includes at least one of varying the size of the jamming messages, transmitting the jamming messages at different intervals or varying the pre-determined length of time during which the jamming messages are transmitted, the neighbor node transitioning out of the LPL mode to respond to the jamming messages from the joining node, the neighbor node sending the network management message in response to the jamming messages; to receive the network management message at the joining node from the neighbor node in response to the jamming messages from the joining node; and to begin data communications with nodes of the wireless mesh network using the synchronized node timer.

6. The network node as claimed in claim 5 wherein the sending node is a gateway device.

7. The network node as claimed in claim 5 including being further configured to listen on the dynamically-determined frequency for a pre-determined amount of time.

8. The network node as claimed in claim 5 wherein the jamming messages are identifiable as jamming messages based on the unique message identifier of the data packet header.

9. A sensor network comprising:
a gateway, including a first processor, the first processor to communicate network management messages to other sensors in a sensor network; and
a sensor, including a second processor, the second processor being configured to listen on a dynamically-determined frequency for the network management message, the sensor network including a neighbor node connected to the wireless mesh network and operating in a low power listening (LPL) mode, the neighbor node in the LPL mode deactivating its radio for at least a period of time; to synchronize a node timer to the network management message, if the network management message is received, the network management message being received periodically throughout normal operation of the sensor network to keep sensors of the sensor network synchronized to a common clock; to send jamming messages to the neighbor node from a joining node not currently connected to the wireless mesh network, the joining node not being connected to the wireless mesh network if the network management message is not received by the joining node, the jamming messages sent from the joining node being data packets each having a header with a unique message identifier, the jamming messages being sent continuously by the joining node for a pre-determined length of time on each of a plurality of different network channels until a response is received from the neighbor node, the jamming messages being varied based on the network channel upon which a particular jamming message is sent, wherein the jamming messages being varied includes at least one of varying the size of the jamming messages, transmitting the jamming messages at different intervals or varying the pre-determined length of time during which the jamming messages are transmitted, the neighbor node transitioning out of the LPL mode to respond to the jamming messages from the joining node, the neighbor node sending the network management message in response to the jamming messages; to receive the network management message at the joining node from the neighbor node in response to the jamming messages from the joining node; and to begin data communications with sensors of the sensor network using the synchronized node timer.

10. The sensor network as claimed in claim 9 wherein the neighbor node is a sensor of the sensor network.

11. The sensor network as claimed in claim 9 wherein the sensor being further configured to listen on the dynamically-determined frequency for a pre-determined amount of time.

12. The sensor network as claimed in claim 9 wherein the jamming messages are identifiable as jamming messages based on the unique message identifier of the data packet header.

13. An article of manufacture comprising a non-transitory machine-readable storage medium having machine executable instructions embedded thereon, which when executed by a machine, cause the machine to:
listen on a dynamically-determined frequency for a network management message sent from a sending node in a wireless mesh network, the wireless mesh network including a neighbor node connected to the wireless mesh network and operating in a low power listening (LPL) mode, the neighbor node in the LPL mode deactivating its radio for at least a period of time;
synchronize a node timer to the network management message, if the network management message is received, the network management message being received periodically throughout normal operation of the wireless mesh network to keep nodes of the wireless mesh network synchronized to a common clock;

send jamming messages to the neighbor node from a joining node not currently connected to the wireless mesh network, the joining node not being connected to the wireless mesh network if the network management message is not received by the joining node, the jamming messages sent from the joining node being data packets each having a header with a unique message identifier, the jamming messages being sent continuously by the joining node for a pre-determined length of time on each of a plurality of different network channels until a response is received from the neighbor node, the jamming messages being varied based on the network channel upon which a particular jamming message is sent, wherein the jamming messages being varied includes at least one of varying the size of the jamming messages, transmitting the jamming messages at different intervals or varying the pre-determined length of time during which the jamming messages are transmitted, the neighbor node transitioning out of the LPL mode to respond to the jamming messages from the joining node, the neighbor node sending the network management message in response to the jamming messages;

receive the network management message at the joining node from the neighbor node in response to the jamming messages from the joining node; and begin data communications with nodes of the wireless mesh network using the synchronized node timer.

* * * * *